United States Patent [19]
Moffat

[11] Patent Number: 5,153,594
[45] Date of Patent: Oct. 6, 1992

[54] ELECTRONIC COUNTER-MEASURE SYSTEM FOR AIRCRAFT

[76] Inventor: William V. Moffat, 24690 Upper Trail, Carmel, Calif. 93921

[21] Appl. No.: 351,185

[22] Filed: Apr. 16, 1973

[51] Int. Cl.⁵ .......................... H04K 3/00; G01S 7/36
[52] U.S. Cl. .................................................... 342/15
[58] Field of Search ............... 343/18 E; 342/14, 15, 342/171

[56] References Cited

U.S. PATENT DOCUMENTS

| | | | |
|---|---|---|---|
| 2,567,261 | 9/1951 | Williams | 343/18 E |
| 2,676,317 | 4/1954 | Purington | 343/18 E |
| 3,072,848 | 1/1963 | DeSocio | 343/18 E |
| 3,171,125 | 2/1965 | Butler | 343/18 E |
| 3,517,388 | 6/1970 | Vermillion | 343/18 E |
| 3,568,194 | 3/1971 | Wilson | 342/15 |
| 3,760,418 | 9/1973 | Cash et al. | 343/18 E |

Primary Examiner—Gregory C. Issing

[57] ABSTRACT

An electronic counter-measure system for installation on an aircraft is disclosed. The system includes an interferometer transmitter comprised of a plurality of repeater amplifier circuits connected in parallel arrangement. A pair of receiving antennas on the aircraft senses an incoming radar signal when the aircraft is being tracked by a fire control radar and initiates the operation of the plurality of repeater amplifier circuits in such a manner that they generate out of phase radio signals of different amplitudes which are respectively transmitted by associated spaced transmitting antennas on the aircraft. These radio signals induce a time varying tilt in the wavefront of the echo signal being returned to the tracking radar with the result that the radar indicates apparent aircraft angular accelerations that capture the radar tracking servo and tax the dynamic stability of the elements in the intercept loop, particularly the missile.

10 Claims, 2 Drawing Sheets

ELECTRONIC COUNTER-MEASURE SYSTEM FOR AIRCRAFT

An electronic counter-measure system for installation on an aircraft is disclosed. The system includes an interferometer transmitter comprised of a plurality of repeater amplifier ciruits connected in parallel arrangement. A pair of receiving antennas on the aircraft senses an incoming radar signal when the aircraft is being tracked by a fire control radar and initiates the operation of the plurality of repeater amplifier circuits in such a manner that they generate out of phase radio signals of different amplitudes which are respectively transmitted by associated spaced transmitting antennas on the aircraft. These radio signals induce a time varying tilt in the wavefront of the echo signal being returned to the tracking radar with the result that the radar indicates apparent aircraft angular accelerations that capture the radar tracking servo and tax the dynamic stability of the elements in the intercept loop, particularly the missile.

This invention relates to electronic counter-measure systems for military aircraft and more particularly to such a system which protects the aircraft by preventing it from being accurately intercepted by a tracking radar and aerodynamically or thrust vector controlled missile.

In an article by Dean D. Howard published in the 1959 issue of the Proceedings of the National Electronics Conference, entitled "Radar Target Angular Scintillation in Tracking and Guidance Systems Based on Echo Signal Phase Front Distortion," a theoretical dissertation is presented of the effect of predominant back scatterers on the slope of the phase front of an echo signal returned from an object being tracked by radar. As is indicated in this publication, the problem of target angle noise has heretofore been of little concern in the field of search radar since generally it is not significant compared to the tolerance requirements for search information. Thus, whereas any consideration given to this angle noise phenomenon by the radar and tracking engineer has heretofore been to avoid or minimize its effects, the present invention, on the other hand, is concerned with the provision of equipment for employing and controlling this phenomenon for use in electronic counter-measure systems for aircraft.

Accordingly, one of the objects of the present invention is to provide equipment on an aircraft for distorting the slope of the phase front of the echo signal returned to a tracking radar so that an apparent angular motion of the aircraft is detected and tracked by the radar.

In texts on aircraft stability and control the classic tactical missile control problem is stated as one of conflict between stability and maneuverability. Thus, the inertial and aerodynamic force characteristics of tactical missiles are such that their open loop frequency response is lightly damped, with large phase lag, in the 1-10 Hz frequency region. However, this open loop frequency response is also the equivalent frequency response region of radar tracking networks designed to accurately respond to target motion. Moreover, maneuvering missiles exhibit interference between control surfaces resulting in cross coupling between the missile roll, pitch and yaw axes. Further, the stability derivatives characterizing missile control surface and body force generating capabilities are nonlinear beyond a few degrees angle of attack. It is therefore evident that the design of a servo system of a tracking radar to control the trajectory of a missile, with fast response, and yet dynamic stability, is exceedingly difficult. Thus, whereas the control designer is faced with increasing sophistication to provide fast response with accuracy, this invention is concerned with the provision of equipment to tax the dynamic stability limits that are fundamental characteristics of accurate intercepting.

Accordingly, another object of the invention is to provide equipment on an aircraft which induces a varying angle rate in an echo signal returned to a tracking radar such that the radar indicates apparent aircraft angular accelerations at equivalent frequencies of 1 to 10 Hz that are capable of capturing the radar tracking servos and taxing the dynamic stability of all elements in the intercept loop, particularly the missile.

Still another object of the present invention is to provide a fully automatic free running electronic counter-measure system on an aircraft that totally frees the aviator to concentrate on attack.

Briefly, the present invention provides an interferometer transmitter on an aircraft comprised of two or more traveling wave tube power amplifiers and associated transmitting antennas that are respectively connected in parallel circuit arrangement. A pair of receiving antennas on the aircraft senses an incoming radar signal when the aircraft is being tracked by fire control radar and initiates the operation of the interferometer transmitter by controlling the traveling wave tube power supply voltage and thereby controlling the relative phase and amplitude of the radar signals being simultaneously generated by the two or more traveling wave tubes. These relatively varying radio signals are then respectively radiated by spaced transmitting antennas on the aircraft to induce angle change in the echo signal being returned to the fire control radar. This causes the radar to detect an apparent angular motion of the aircraft which results in increased miss distance dispersion of missiles fired at the aircraft.

With these and other objects in view, the invention consists of the arrangement, location, and combination of the various parts of the system, whereby the objects contemplated are attained as herein set forth, pointed out in the appended claims, and illustrated in the accompanying drawings.

IN THE DRAWINGS

Figure 1:
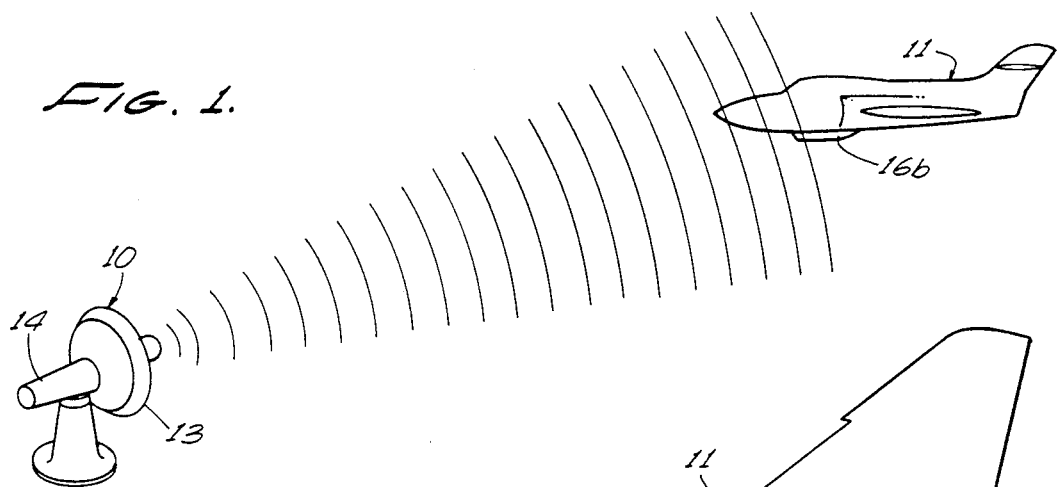
FIG. 1 shows an aircraft with the electronic counter-measure system of the present invention installed thereon being tracked by a fire control radar.

Referring to the illustration in FIG. 1, a tracking or fire control radar 10 is shown for tracking an aircraft 11. The radar 10 includes a directional antenna 13 which is rotated by a motor 14 so that the antenna 13 sweeps completely around the radar station while transmitting a series of modulated radio frequency signals. When the radar signal wave strikes an object such as aircraft 11, some of the energy is reflected as an echo signal back to the tracking radar 10. By various techniques the tracking radar 10 seeks the direction of the aircraft 11 by measuring the angle of the phase or wave front of the echo signal. One way of doing this is by rotating the directional antenna 13 until the returning echo signal is a maximum. The aircraft 11 is then detected as being in a direction normal to the wave front of the received echo signal. The tracking radar 10 also usually determines the distance of the aircraft by measuring the time between the transmission of the radar pulse and its return. The tracking information obtained by the radar 10 is then fed into a fire control computer (not shown) which aims and fires a missile in the proper direction and time so as to intercept the aircraft 11.

The electronic counter-measure system of the present invention when installed on the aircraft 11 provides for protecting the aircraft by preventing it from being accurately intercepted by the fire control radar 10 and guided missile. It does this by inducing phase and amplitude modulation in the echo signal which causes the wave front being returned to the radar 10 to be sufficiently tilted such that when the radar seeks the direction normal to the wave front of the received echo signal it indicates an apparent angular acceleration of the aircraft. Thus, when the tracking information is fed into the computer, it causes missiles to be directed with constantly varying angular steering commands which results in an increased miss distance about the aircraft.

Figure 2:
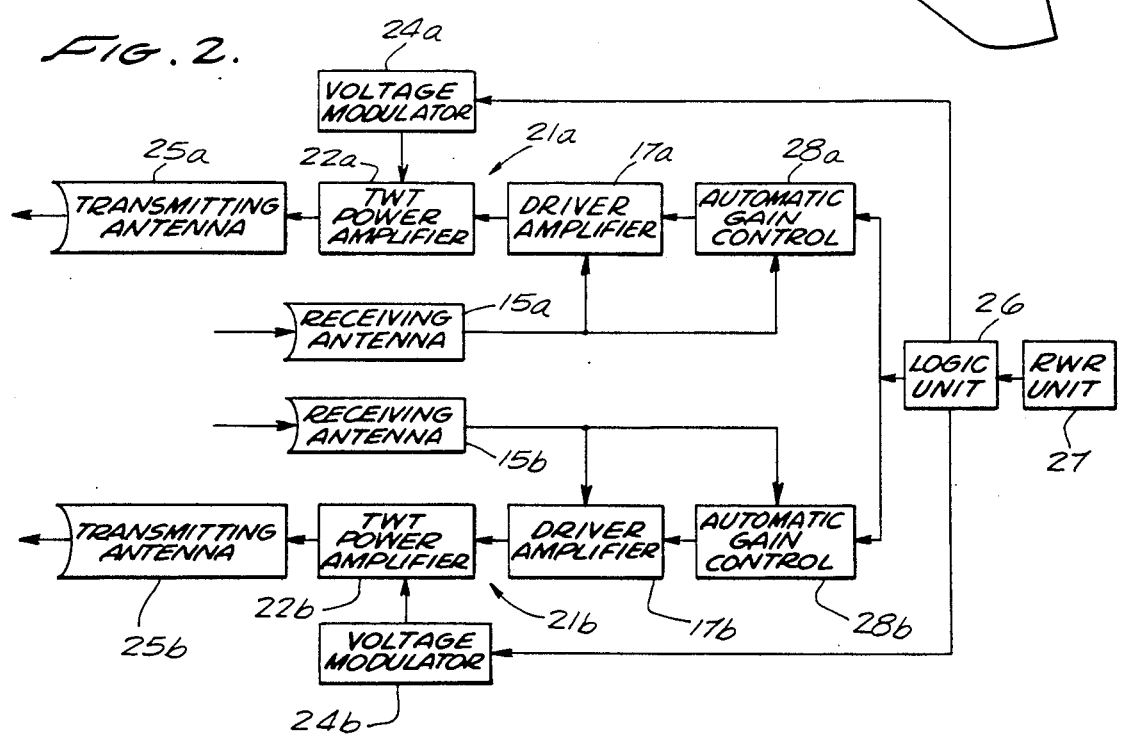
FIG. 2 is a functional block diagram of the electronic counter-measure system of the present invention.

FIG. 2 shows a functional block diagram of the electronic counter-measure equipment installed on the aircraft. This equipment includes receiving antennas 15a and 15b which gather the incoming radar signal from the tracking radar 10 and feed traveling wave tube driver amplifiers 17a and 17b which respectively drive parallel interferometer repeater amplifier circuits 21a and 21b. The repeater amplifier circuit 21a includes a traveling wave tube power amplifier 22a controlled by a phase and gain voltage modulator circuit 24a to generate time modulated radio waves to be sent out by a transmitting antenna 25a. The repeater amplifier circuit 21b includes a traveling wave tube power amplifier 22b controlled by a phase and gain voltage modulator circuit 24b to generate time modulated radio waves to be sent out by a transmitting antenna 25b. A logic unit 26 controls the voltage modulator circuits 24a and 24b and driver automatic gain voltage control circuits 28a and 28b to vary the relative electrical phase and power generated by the repeater amplifier circuits 21a and 21b. The radio waves focused and propagated by the transmitting antennas 25a and 25b back to the tracking radar 10 simultaneously with the echo signal induce distortion in the echo signal which results in the slope of the echo signal wave front to be tilted and an apparent time varying target directional reading to be detected by the radar 10.

Figure 3:
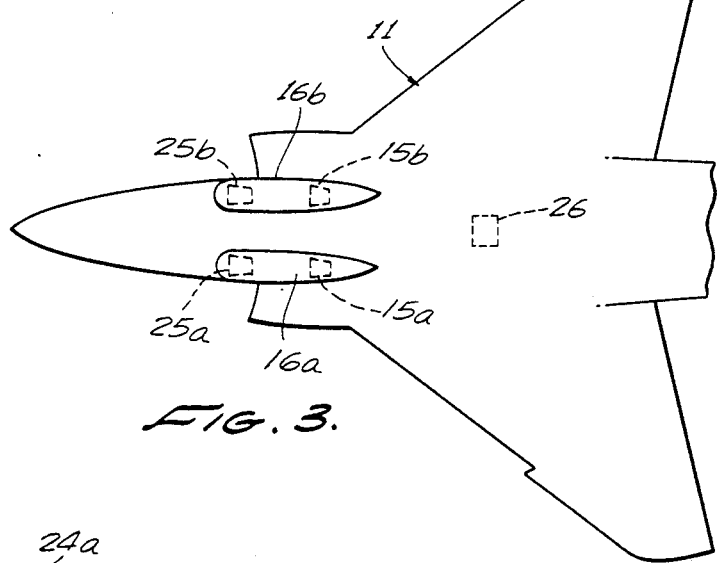
FIG. 3 is a bottom view of the aircraft in FIG. 1.
Figure 4:
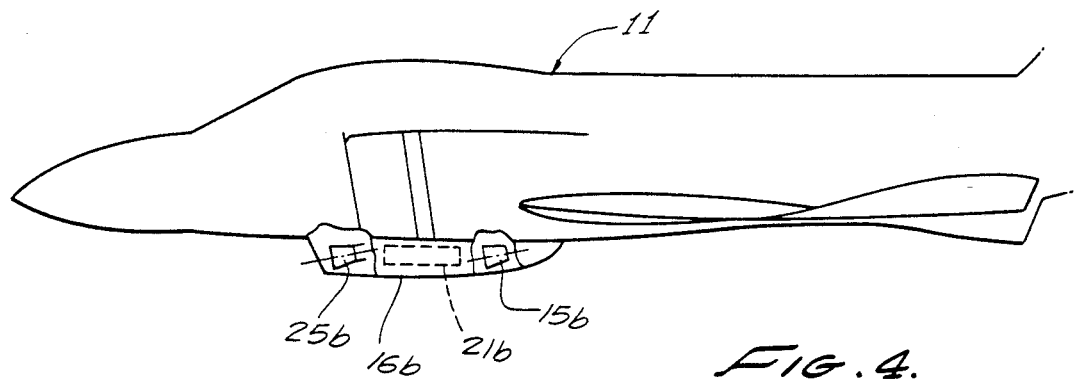
FIG. 4 is a side view of the aircraft.
Figure 5:
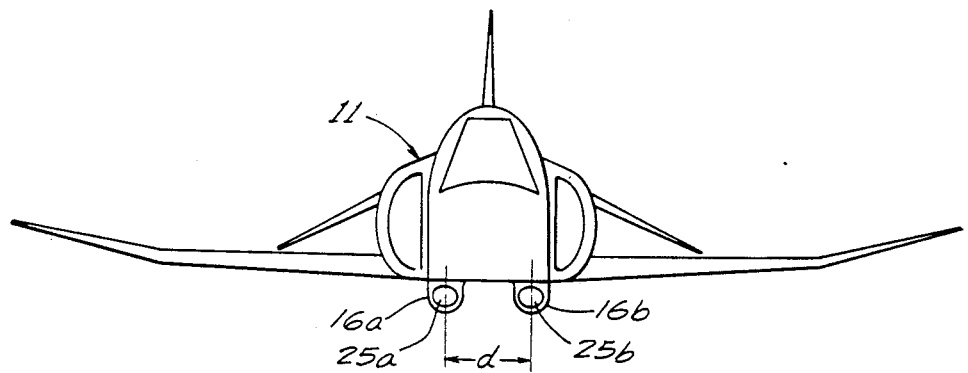
FIG. 5 is a front view of the aircraft.

Reference will next be made to FIGS. 3-5 which show where the components of the electrical counter-measure system are installed on the aircraft 11 for the preferred embodiment of the present invention. The receiving antennas 15a and 15b are enclosed in the aft end of radomes forming sparrow missile wells 16a and 16b, respectively. The repeater amplifier circuit 21a, including driver amplifier 17a, gain voltage control circuit 28a, voltage modulator circuit 24a, and power amplifier 22a, is installed within the fairing of the right forward sparrow well 16a, and transmitting antenna 25a is enclosed in the front end of sparrow well 16a. Similarly, the repeater amplifier circuit 21b, including driver amplifier 17b, gain voltage control circuit 28b, voltage modulator circuit 24b, and power amplifier 22b, is installed within the fairing of the left forward sparrow well 16b, and transmitting antenna 25b is enclosed in the front end of sparrow well 16b. The logic unit 26 is mounted internally in the fuselage avionics bay behind the sparrow wells 16a and 16b.

It should be noted that by installing the equipment of the electronic counter-measure system as shown in FIGS. 3-5, the transmitting antennas 25a and 25b are spaced apart in accordance with the spacing d of the sparrow wells 16a and 16b, as shown in FIG. 5. This provides the desired interferometer effect of the repeater amplifier circuits 21a and 21b on the returned, i.e., the echo, radar signals.

The voltage modulator circuits 24a and 24b are controlled by the logic unit 26 based on video received from the Radar Warning Receiver (RWR) unit 27 onboard the target aircraft 11 to modulate the anode or focus electrode voltage of the traveling wave tube power amplifiers 22a and 22b at different rates and thereby vary the relative phase and amplitude of the radio signals generated by these tubes in the respective repeater circuits 21a and 21b.

It should now be clearly understood that the distortion imparted to the echo signal wave front by the electronic counter-measure system of the present invention is proportional to both the phase and amplitude difference in operation of the parallel repeater circuits 21a and 21b and the projected spacing of the transmitter antennas 25a and 25b towards the radar 10.

Figure 6:
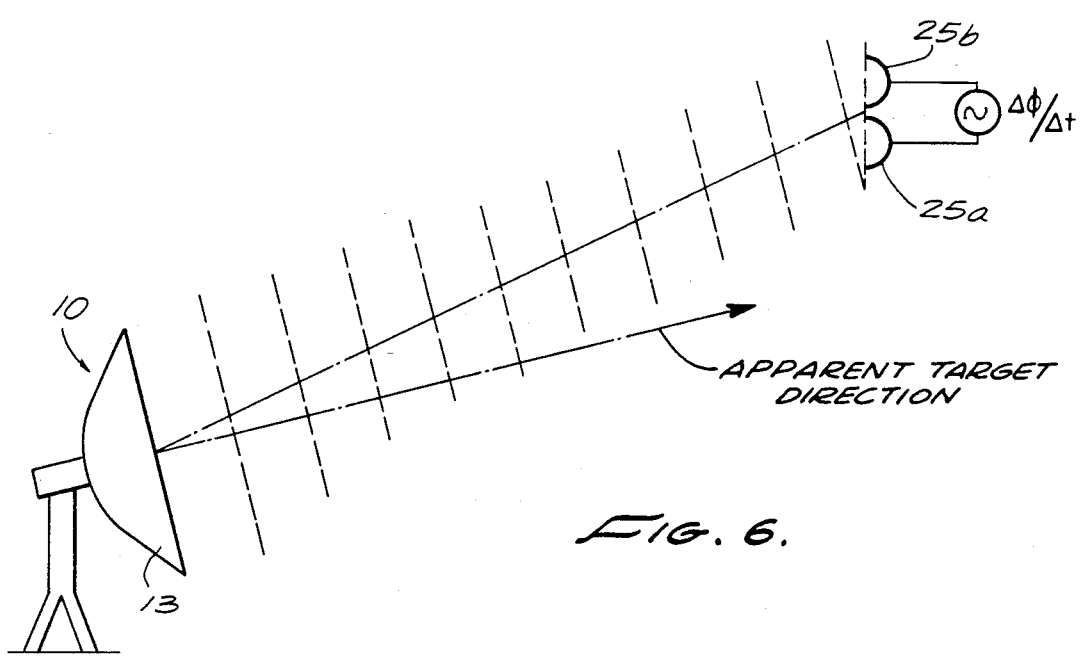
FIG. 6 shows a diagram for explaining the echo signal phase front modulation principle of the invention.

The electronic counter-measure system carried on the aircraft 11 is free running and is automatically operated independently of the aviator on receipt of the radar pulse received by the receiving antennas 15a and 15b and the driver amplifiers 17a and 17b that respectively drive the traveling wave tube power amplifiers 22a and 22b. The voltage modulator circuits 24a and 24b and gain voltage control circuits 28a and 28b are then controlled in real time by logic unit 26 based on non-real time RWR unit 27 so that the time rate of change of the control voltage applied on the traveling wave tube power amplifiers 22a and 22b control the relative phase and amplitude of the radio waves generated by these tubes, and the driver amplifiers 17a and 17b control the absolute power for the duration of the radar signal. The transmitting antennas 25a and 25b each focuses and propagates the outgoing radio waves from its respective repeater amplifier circuit, back to the tracking radar 10. Thus, as shown in FIG. 6, the time varying relative modulation of the signals generated by the repeater amplifier circuits 21a and 21b results in distorting the wave front of the echo signal reflected from the aircraft 11 such as to tilt the phase front as it arrives at the tracking radar 10. Since the tracking radar 10 seeks a direction normal to the phase front of the received echo signal, it indicates and supplies tracking information to the computer concerning the apparent angular motion of the aircraft 11.

It should be particularly noted that the logic unit 26 accepts nonreal time video data from the RWR unit 27 and generates and controls the time rate of change of the relative phase and amplitude of the repeater amplifier circuits 21a and 21b at different equivalent target maneuver frequencies. This causes the wave front of the echo signal returning to the tracking radar 10 to be angularly swung to induce apparent target angular accelerations at frequencies of 1-10 Hz that are capable of capturing the radar tracking servos and taxing the dynamic stability of all the elements in the intercept loop such that the intercept is rendered ineffective.

Although the description herein has been concerned with a particular embodiment, it is to be understood that the invention is subject to various modifications without departing from the principle involved or sacrificing any of its advantages. The present invention, therefore, is not to be limited to the specific disclosure provided herein but is to be considered as including all possible modifications and variations coming within the scope of the invention as defined in the appended claims.

What is claimed is:

1. An electronic counter-measure system for installation on an aircraft comprising:
    a receiving antenna;
    a pair of parallel repeater circuits coupled to said receiving antenna, each said circuit including a radio frequency amplifier and a transmitting antenna, the transmitting antenna of the repeater circuits being spaced from each other; and
    a voltage modulator for time varying control of the relative phase of signals passing through said radio frequency amplifier;
    whereby a radar signal received from a tracking radar by said receiving antenna is returned as an echo signal containing an apparent target angular acceleration induced therein by the relatively phased signals supplied by the radio frequency amplifiers and transmitted by the transmitting antennas.

2. An electronic counter-measure system for installation on an aircraft, comprising:
    sensing means for sensing when a radar signal from a fire control radar strikes the aircraft;
    interferometer antenna means; and
    radio frequency amplifier means responsive to said sensed radar signal and including modulating means for distorting in a time varying manner the wave front of the echo signal reflected back to the fire control radar by varying the relative phase and amplitude of said interferometer antenna means so as to provide an apparant aircraft angular acceleration indication on the radar.

3. The invention in accordance with claim 2 wherein said radio frequency amplifier means and said interferometer antenna means comprise a plural element interferometer transmitter, and
    wherein each element of said interferometer transmitter has its radio frequency phase and amplitude varied relative to the other by said modulating means at frequency rates on the order to 1 to 10 Hz.

4. An electronic counter-measure system for installation on an aircraft comprising:
    a pair of receiving antennas;
    a pair of parallel repeater circuits, each said circuit coupled to a respective receiving antenna and including a radio frequency amplifier and a transmitting antenna; and
    a voltage modulator means for time varying control of the relative phase and amplitude of the parallel repeater circuits;
    whereby when a radar signal from a tracking radar is received by said receiving antenna said repeater circuits are activated and their relative phase and amplitude controlled by said voltage modulator means to cause said transmitting antennas to transmit time varying phase radio waves of time varying amplitude which cause the wave front of the echo signal returning to the tracking radar to be tilted so as to give an apparent angular accelerating target tracking reading.

5. The invention in accordance with claim 4 wherein said transmitting antennas are respectively located on spaced extremities of said aircraft, and
    wherein said receiving antennas are located on said aircraft remote of said transmitting antennas.

6. The invention in accordance with claim 4 including a programmable logic circuit for controlling said voltage modulator means.

7. The invention in accordance with claim 6 wherein said logic circuit is programmed to control the time rate of change of voltages applied by the voltage modulator means on control electrodes of said radio frequency amplifiers.

8. The invention in accordance with claim 4 wherein each said repeater circuit includes a driver amplifier for controlling the gain of the signal received by said receiving antenna and thereby the absolute power of the signals passing through said repeater circuits.

9. The invention in accordance with claim 4 including an automatic gain control for each said repeater circuit.

10. The invention in accordance with claim 6 including a radar warning receiver on board the aircraft for controlling said logic circuit.

* * * * *